B. F. GREGORY.
STREET SWEEPING MACHINE.
APPLICATION FILED DEC. 22, 1910.
1,000,798.
Patented Aug. 15, 1911.
3 SHEETS—SHEET 3.
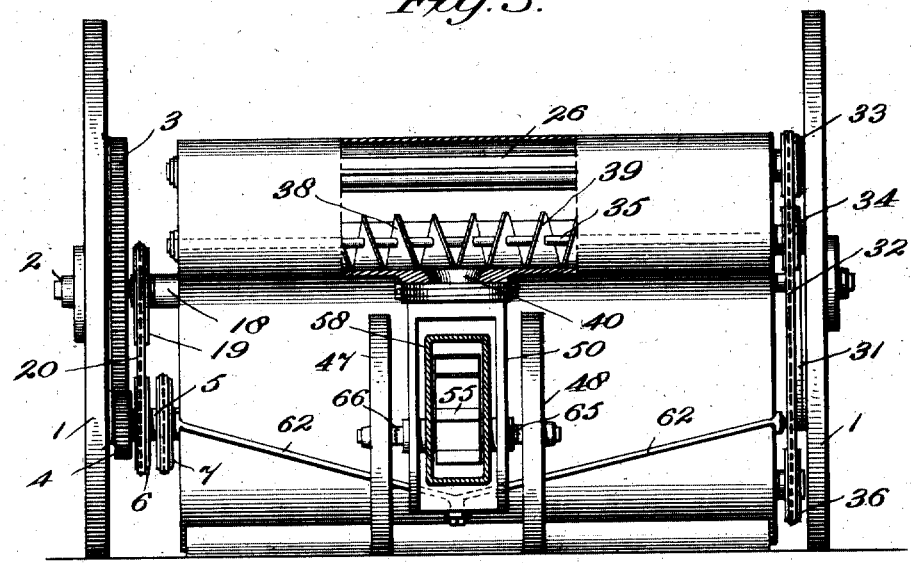
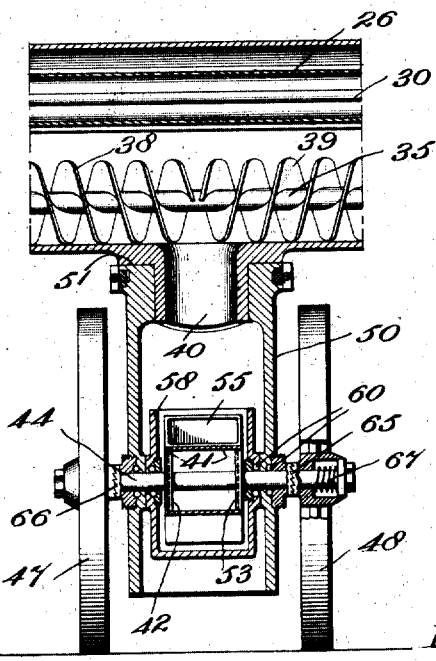

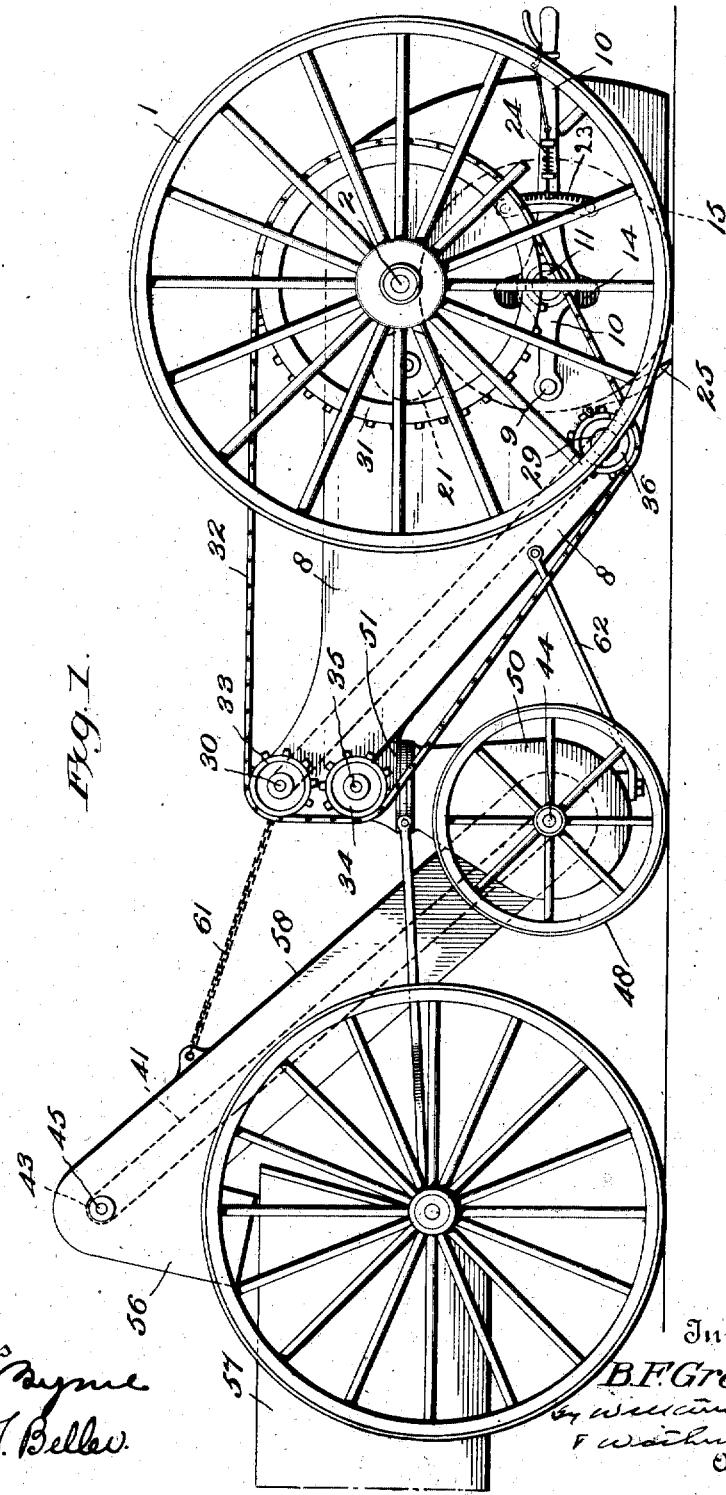

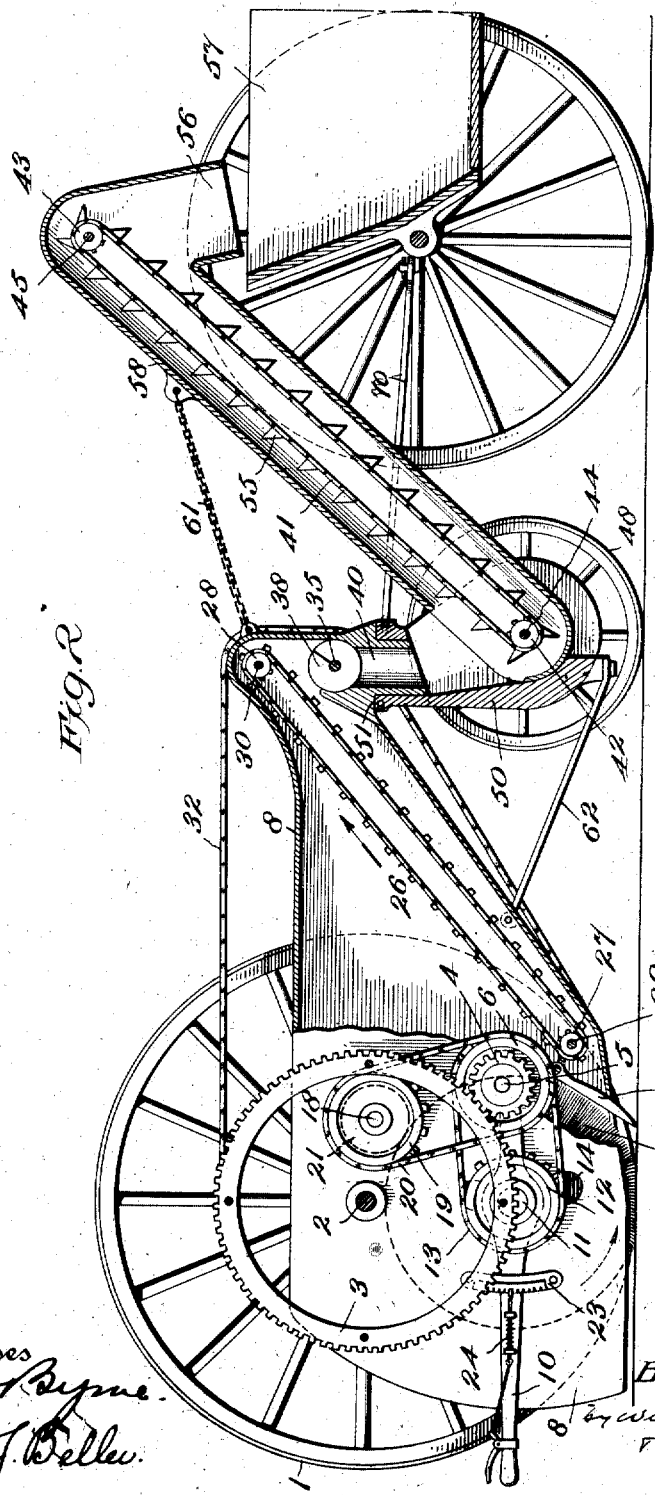

UNITED STATES PATENT OFFICE.

BENJAMIN F. GREGORY, OF LEWISTOWN, PENNSYLVANIA.

STREET-SWEEPING MACHINE.

1,000,798.
Specification of Letters Patent. Patented Aug. 15, 1911.
Application filed December 22, 1910. Serial No. 598,827.

*To all whom it may concern:*

Be it known that I, BENJAMIN F. GREGORY, a citizen of the United States, residing at Lewistown, in the county of Mifflin and State of Pennsylvania, have invented certain new and useful Improvements in Street-Sweeping Machines; and I do hereby declare the following to be a full, clear, and exact description of the invention, such as will enable others skilled in the art to which it appertains to make and use the same.

This invention relates to street sweeping machines and has for its object to produce a machine of this nature which will be comparatively simple in construction, and more efficient in action than those heretofore proposed.

To these ends the invention consists in the novel details of construction and combinations of parts more fully hereinafter disclosed and particularly pointed out in the claims.

Referring to the accompanying drawings forming a part of this specification in which like numerals designate like parts in all the views—Figure 1 is a side elevational view of a machine built in accordance with my invention; Fig. 2 is a sectional view of the parts shown in Fig. 1; Fig. 3 is a transverse sectional view at or near the middle of the machine; Fig. 4 is a transverse sectional view taken on an enlarged scale of certain of the parts shown in Fig. 3; and, Fig. 5 is a diagrammatic plan view of the machine and dump wagon showing the action of the parts when turning sharp curves.

1 indicates the rear wheels mounted upon the rear axle 2, and rigid with one of the rear wheels is a driving gear 3, meshing with a pinion 4, rigid with a shaft 5, and carrying the sprocket wheels 6 and 7.

Pivotally mounted as at 9 upon an inclosing casing 8, to be referred to hereinafter, is a lever 10, carrying a shaft 11 on which is mounted a sprocket wheel 12, and a chain 13 extends between said sprocket wheel 12 and said sprocket wheel 7. The shaft 11 extends from side to side of the casing 8 and moves up and down in slots 14 therein, there being duplicate levers 10 on each side of said casing in which the ends of said shaft 11 are supported. Between said levers 10 and mounted upon said shaft 11 is the main sweeping brush 15, which receives a rotary motion from the sprocket wheel 12, as will be readily understood. The shaft 11 is located vertically below the axle 2, and therefore the said brush 15 contacts at its lowest point with the line joining the lowest points of the wheels 1, thereby enabling the said brush to exert a firm pressure upon the ground to be swept and at the same time to effectually clean the same. Also mounted upon the casing 8 and extending from side to side of said casing is a shaft 18 carrying at one end the sprocket wheel 19 connected by the sprocket chain 20 to the sprocket wheel 6. Said shaft 18 also has mounted thereon a cleaning brush 21, best shown in dotted lines in Figs. 1 and 2, which brush is rotated in contact with the main brush 15, and acts to clean the same.

Each of the levers 10 is adjustably mounted over a segment rack 23 and is provided with suitable means such as 24 for holding said levers in any position to which they may be moved. The adjustment of said levers 10 of course regulates the pressure of the brush 15 upon the surface to be cleaned.

25 represents the usual pivot gate extending from side to side of the machine against which the dirt is thrown and from which it is carried by said brush on to the conveyer 26 mounted upon the sprocket wheels 27 and 28 carried by the shafts 29 and 30 respectively.

Mounted upon another of the wheels 1, and on the side of the machine opposite to that carrying the gear 3, is the sprocket 31, best shown in Fig. 1, over which passes the sprocket chain 32. Said chain 32 also passes over a sprocket wheel 33 mounted on said shaft 30, over another sprocket 34 mounted on a shaft 35 and over a third sprocket 36 mounted upon the shaft 29. This said sprocket wheel 31, therefore, imparts motion to the conveyer 26, through the medium of the chain 32 and the said conveyer 26 carries the dirt, etc., up in the direction of the arrow and drops the same upon the oppositely inclined screw conveyers 38 and 39, carried by the shaft 35, which conveyers in turn carry the said material to the chute 40 and deliver the same to the conveyer 41, mounted on the sprockets 42 and 43, carried by the shafts 44 and 45, respectively. The screw conveyers 38 and 39 are mounted upon the shaft 35 and therefore receive their motion from the sprocket 34 and the chain 32, as will be readily understood. The machine is also provided with two small front wheels 47 and 48, mounted upon the axle or shaft 44, and these wheels are placed quite close together as compared to the distance between the rear wheels 1. The said axle 44 also carries the partially closed framework 50 into the upper end of which fits the chute 40, which latter is provided with the bearing surface 51, resting upon the extreme upper end of said frame 50. The structure is such that it closely resembles in action the fifth wheel of a vehicle, as will be readily understood. The said shaft 44 is also rigid with the sprocket 42, and likewise carries a companion sprocket 53, as best shown in Fig. 4. The conveyer chain 41 which receives the dirt through the chute 40 extends from the sprocket 42 to the sprocket 53, and consequently receives its motion from both of said sprockets.

The dirt after being elevated by the buckets 55 of the conveyer 41 is finally dumped through the chute 56 into a wagon 57, as will be readily understood.

The casing 8 extends entirely over and incloses the brushes 15 and 21, as well as the conveyer 26, so that practically no dust escapes at all. In the same way, the conveyer 41 is inclosed in a casing 58, which practically prevents the escape of dust therefrom, and if desired, the wagon 57 may be provided with a cover which will prevent the escape of dust after the material is delivered in said wagon. All the parts wherever desirable, are also provided with ball bearings such as 60, and the conveyer casing 58 is braced as by means of the chain 61. The framework 50 is also braced from said casing 8, as by the rod 62. The conveyer casing 58 is likewise mounted at its lower end on the said shaft 44 as best illustrated in Figs. 2, 3 and 4, and in most cases it is preferred to employ ball bearings, as illustrated.

As illustrated diagrammatically in Fig. 5, since the front wheels 47 and 48 are much closer together than are the rear wheels, very sharp curves may be turned, and in order to permit this action, I provide clutch couplings 65 and 66 on the said shaft 44, which couplings will enable one wheel 48 to travel faster than the other wheel 47, for example, and in a manner well known. To facilitate this action, the hubs of the said wheels are provided with the springs 67 in order that the members of the said clutch couplings may spread apart and be forced back into engagement. In order to further steady the parts, a brace 70 may be provided between the swiveled frame 50 and the wagon 57, as shown.

The operation of my improved sweeper will be clear from the foregoing, but may be briefly summarized as follows:—The brush 15 being suitably adjusted by the levers 10, the machine is propelled by any suitable power, when the rear wheels 1 will through the gear 3, turn the pinion 4, which rotates the sprocket 12 through the chain 13, and thereby turns the axle 11 of the said brush. Material is carried by said brush against the transverse plate 25, and is swept therefrom on to the conveyer 26, which delivers the said material to the oppositely disposed screw conveyers 38 and 39, which conveyers deliver the material through the chute 40 into the buckets 55 of the conveyer 41, and these said buckets finally deliver the material into the wagon 57. In turning sharp corners, as illustrated in Fig. 5, the swiveled connection 51 enables the parts to readily adjust themselves, as indicated, owing to the comparatively very short distance between the front wheels 47 and 48. All of the parts are inclosed, as shown, so that the escape of dust is prevented. The conveyers 26, 38 and 41 receive their power from the chain 32, driven by the gear 31, as will be readily understood.

It is obvious that those skilled in the art may vary the details of construction and arrangement of parts without departing from the spirit of my invention, and therefore I do not wish to be limited to such features except as may be required by the claims.

What I claim is:—

1. In a street sweeping machine provided with front and back wheels, the combination of a brush; a conveyer adapted to receive material from said brush; a second conveyer adapted to receive said material from said first conveyer; a third conveyer adapted to receive said material from said second conveyer; and a swiveled connection mounted on the said front wheels of said machine between said second and third conveyers, substantially as described.

2. In a street sweeping machine provided with front and back wheels, the combination of a brush, mounted under the axle of the back wheels; means attached to said wheels for driving said brush; a conveyer adapted to receive material from said brush; a second conveyer adapted to receive said material from said first conveyer; a third conveyer adapted to receive said material from said second conveyer; means associated with said front wheels for driving said third conveyer; means for manually controlling the pressure of said brush on the surface to be swept; and a swiveled connection mounted on the said front wheels of said machine between said second and third conveyers, substantially as described.

3. In a street sweeping machine provided with front wheels, the combination of a conveyer; a second conveyer located over said wheels adapted to receive material from said first conveyer; means provided with a chute associated with said second conveyer; a frame carried by said wheels and swiveled to said means; a casing mounted in said frame and on said wheels; and a third conveyer adapted to receive material from said chute mounted in said casing, substantially as described.

5. In a street sweeping machine, provided with rear wheels and front wheels located closer together than said rear wheels; oppositely disposed screw conveyers located over said front wheels; a conveyer adapted to deliver material to said screw conveyers; means provided with a chute located below said screw conveyers; a partially closed frame mounted on said front wheels and swiveled to said means; and a conveyer having one end also mounted on said front wheels adapted to receive material from said chute, substantially as described.

5. In a street sweeping machine provided with rear wheels and front wheels located closer together than said rear wheels; a brush located below the axle of said rear wheels; a plate adapted to receive material taken up by said brush; a conveyer adapted to receive material swept from said plate by said brush; oppositely disposed screw conveyers located over said front wheels, adapted to receive material from said first mentioned conveyer; means provided with a chute located below said screw conveyers; a partially closed frame mounted on said front wheels and swiveled to said means; and a conveyer having one end also mounted on said front wheels adapted to receive material from said chute, substantially as described.

In testimony whereof, I affix my signature, in presence of two witnesses.

BENJAMIN F. GREGORY.

Witnesses:
  M. E. GROVE,
  ALLEN A. ORR.